(12) United States Patent
Yoshida

(10) Patent No.: US 10,639,978 B2
(45) Date of Patent: May 5, 2020

(54) PANEL STRUCTURE AND METHOD FOR PRODUCING SAME

(71) Applicant: WEBASTO JAPAN CO., LTD., Higashihiroshima-shi, Hiroshima (JP)

(72) Inventor: Osamu Yoshida, Higashihiroshima (JP)

(73) Assignee: WEBASTO JAPAN CO., LTD., Hiroshima (JP)

(*) Notice: Subject to any disclaimer, the term of this patent is extended or adjusted under 35 U.S.C. 154(b) by 22 days.

(21) Appl. No.: 16/084,884

(22) PCT Filed: Feb. 27, 2017

(86) PCT No.: PCT/JP2017/007493
§ 371 (c)(1),
(2) Date: Sep. 13, 2018

(87) PCT Pub. No.: WO2017/159318
PCT Pub. Date: Sep. 21, 2017

(65) Prior Publication Data
US 2019/0061495 A1    Feb. 28, 2019

(30) Foreign Application Priority Data
Mar. 18, 2016  (JP) ................ 2016-055029

(51) Int. Cl.
| | |
|---|---|
| *B60J 7/12* | (2006.01) |
| *B60J 7/06* | (2006.01) |
| *B60J 7/185* | (2006.01) |
| *B60J 7/20* | (2006.01) |

(52) U.S. Cl.
CPC ............. *B60J 7/1265* (2013.01); *B60J 7/061* (2013.01); *B60J 7/12* (2013.01); *B60J 7/1204* (2013.01); *B60J 7/1855* (2013.01); *B60J 7/207* (2013.01)

(58) Field of Classification Search
CPC ... B60J 7/1265; B60J 7/061; B60J 7/12; B60J 7/1204; B60J 7/1855; B60J 7/207
See application file for complete search history.

(56) References Cited

U.S. PATENT DOCUMENTS

| | | | |
|---|---|---|---|
| 2007/0262615 A1* | 11/2007 | Koizumi | ................ B62D 25/08 296/201 |
| 2008/0054675 A1* | 3/2008 | Moroishi | ............... B60J 5/0426 296/146.6 |
| 2010/0283286 A1 | 11/2010 | Odoi et al. | |
| 2014/0159351 A1* | 6/2014 | Masatsugu | ............ B60R 13/025 280/728.2 |

(Continued)

FOREIGN PATENT DOCUMENTS

| | | |
|---|---|---|
| JP | S59-150664 U | 10/1984 |
| JP | 2007-261412 A | 10/2007 |
| JP | 2008-164061 A | 7/2008 |

*Primary Examiner* — Lori L Lyjak
(74) *Attorney, Agent, or Firm* — Maschoff Brennan

(57) ABSTRACT

A panel structure 30 includes a panel 40 having a first insertion hole 42, a reinforcement 50 having a second insertion hole 52, and a fixing member 70 having a shaft 71 inserted in the first and second insertion holes 42 and 52, and sandwiching and fixing the panel 40 and the reinforcement 50 in their thickness direction. The panel 40 has a higher thermal expansion coefficient than the reinforcement 50. A diameter of the second insertion hole 52 in a direction of thermal expansion of the panel 40 is larger than a diameter of the first insertion hole 42 in the direction.

6 Claims, 9 Drawing Sheets

(56) References Cited

U.S. PATENT DOCUMENTS

2014/0230363 A1* 8/2014 Tak .......................... E04C 3/02
  52/831
2014/0354010 A1* 12/2014 Ohta ....................... E02F 9/163
  296/190.03
2014/0367997 A1* 12/2014 Yamanaka ........... B62D 25/163
  296/191

* cited by examiner

FIG.6
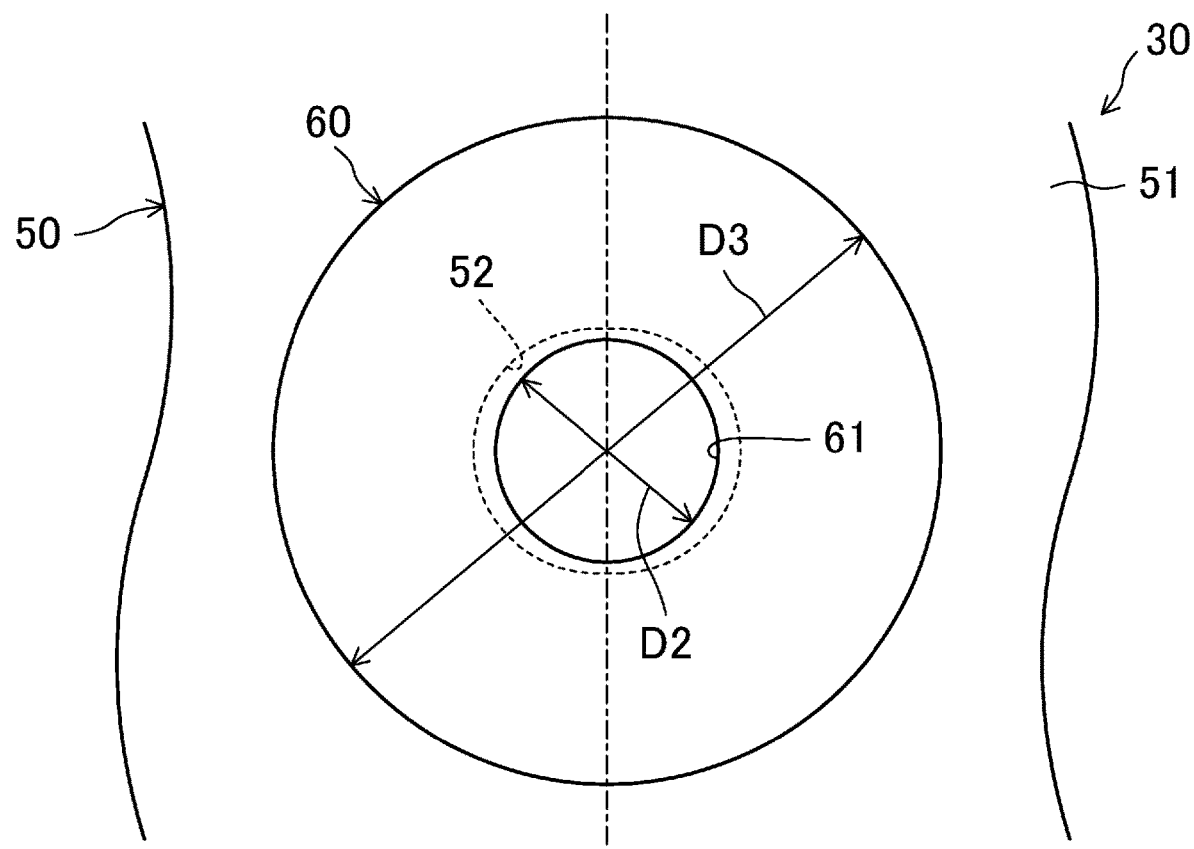
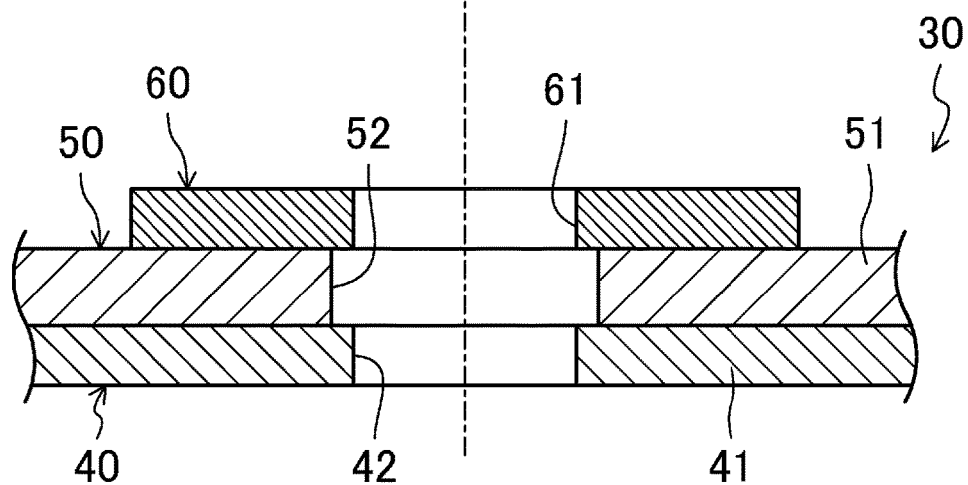

FIG.7
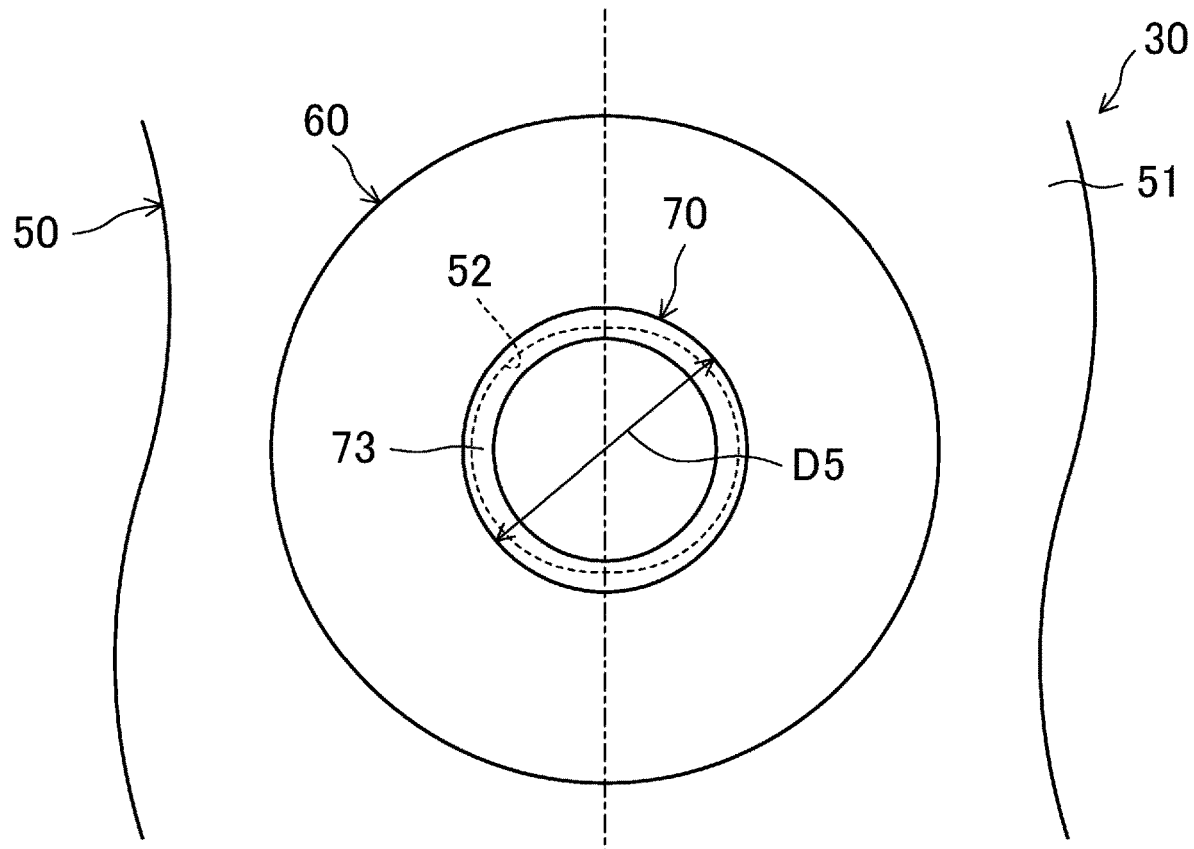
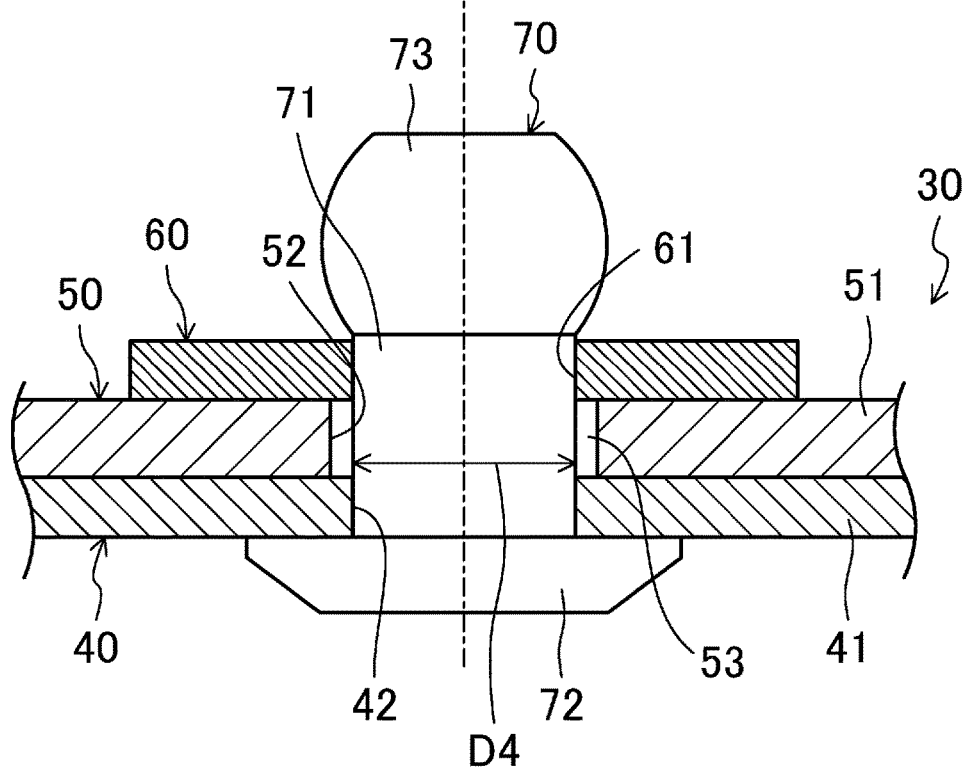

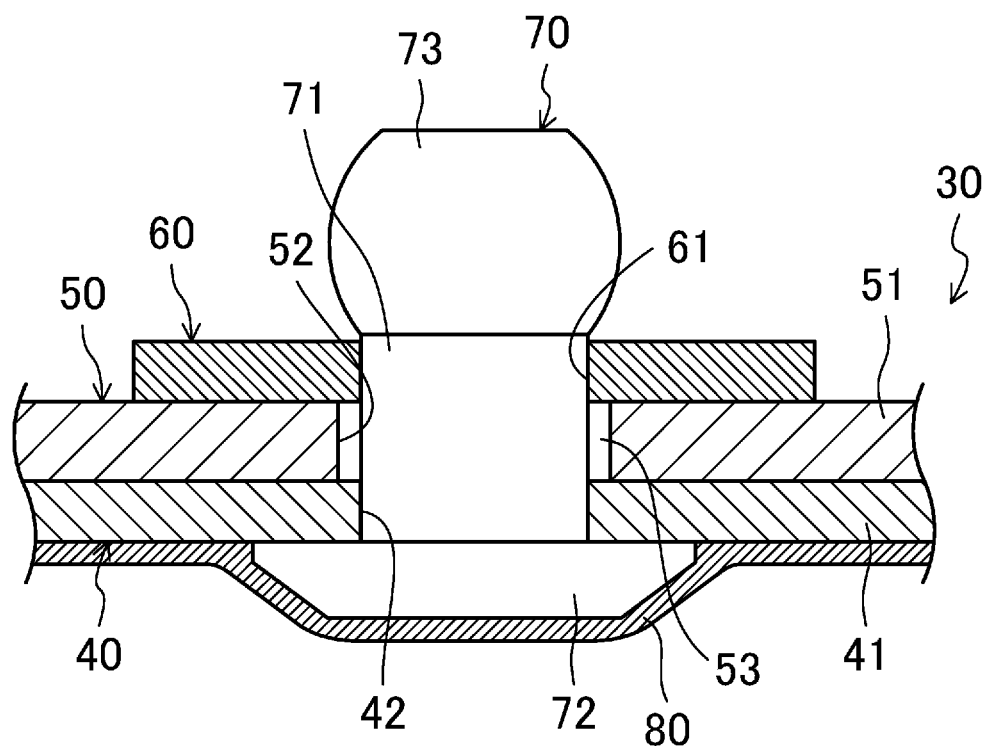
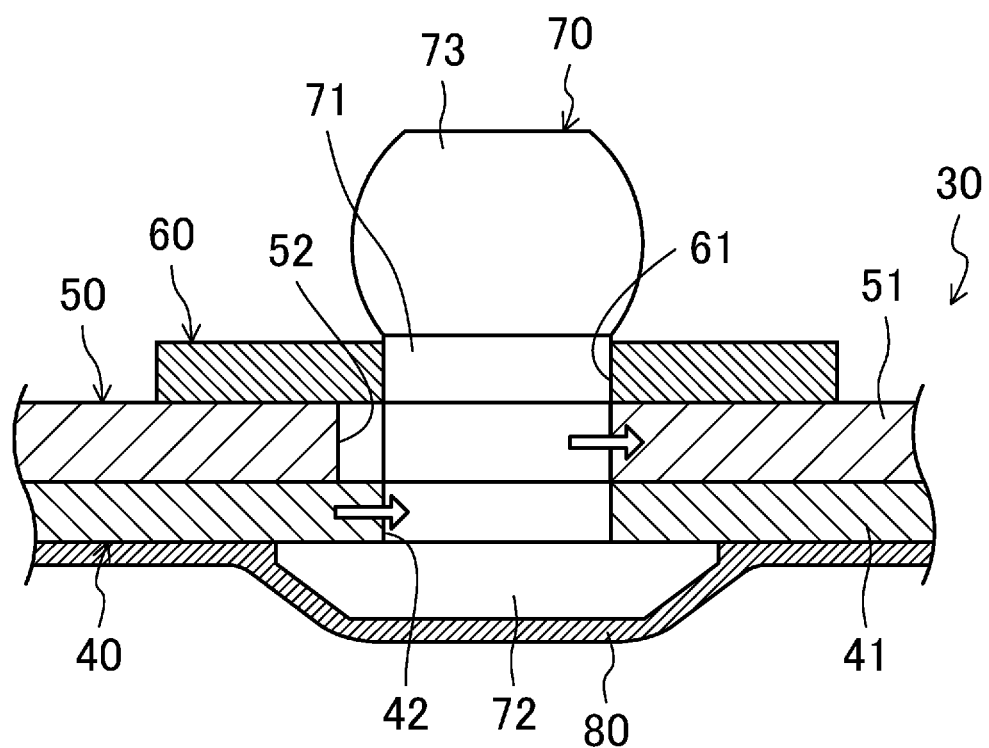

PANEL STRUCTURE AND METHOD FOR PRODUCING SAME

TECHNICAL FIELD

The present invention relates to a panel structure and a method for producing the same.

BACKGROUND ART

A panel structure applied to a roof panel or any other components of a vehicle has been known (see Patent Document 1).

As Patent Document 1 shows in FIG. 6, a panel structure includes an outer panel toward the outside of a vehicle, an inner panel toward a cabin, and a reinforcement provided between these panels. The reinforcement is stacked on a rear side of the inner panel to improve the strength of the inner panel.

CITATION LIST

Patent Documents

[Patent Document 1] Japanese Unexamined Patent Publication No. 2007-261412

SUMMARY OF THE INVENTION

Technical Problem

According to the panel structure of Patent Document 1, the panel and the reinforcement are fixed together via a certain fixing member. However, if the panel and the reinforcement have different thermal expansion coefficients, one of the panel or the reinforcement may further expand thermally than the other in a certain direction when heat is applied to the panel structure. In such a case, stress is concentrated on a region of contact between the fixing member and the panel to deform the panel and/or the fixing member, and eventually, fixing strength between the panel and the reinforcement may be lowered.

As a possible solution to this problem, the panel can be made of a material having a higher thermal expansion coefficient than the reinforcement, and an insertion hole formed through the panel for receiving the fixing member can be made larger in diameter than an insertion hole formed through the reinforcement for receiving the fixing member. In this configuration, even if the panel thermally expands, the relatively large insertion hole of the panel can avoid firm contact between the panel and a shaft of the fixing member. This can avoid the fixing strength between the panel and the reinforcement from being lowered. However, the inventor of the present invention has found another problem of this configuration.

In this panel structure, the panel and the reinforcement are fixed together via the fixing member, and then, the surface of the panel is coated. In this coating step, a coating material is applied to not only the surface of the panel, but also the surface of the fixing member (e.g., a head of a rivet). When the coating material thus applied is thermally dried, the panel having a higher expansion coefficient thermally expands. If the relative positions of the panel and the fixing member change within the relatively large insertion hole of the panel (the panel's insertion hole), the coating on the surfaces of the panel and the fixing member is pulled in the direction of thermal expansion of the panel. If the coating is dried in this state, a mark, such as a scratch, is left on the coating around the surface of the fixing member. This may impair the appearance and/or anticorrosive property of the panel structure.

In view of the foregoing, the present invention has been achieved to provide a panel structure which can avoid a coating around the fixing member from being scratched.

Solution to the Problem

A first aspect of the present invention is directed to a panel structure. The panel structure includes: a panel having a first insertion hole; a reinforcement having a second insertion hole; and a fixing member having a shaft inserted in the first and second insertion holes, and sandwiching and fixing the panel and the reinforcement in their thickness direction, wherein the panel has a higher thermal expansion coefficient than the reinforcement, and a diameter of the second insertion hole at least in a direction of thermal expansion of the panel is larger than a diameter of the first insertion hole in the direction.

In this configuration, a diameter of the second insertion hole at least in a direction of thermal expansion of the panel is larger than a diameter of the first insertion hole in the direction. Thus, the shaft of the fixing member is restrained from moving relative to the panel in the first insertion hole, while the shaft is permitted to move relative to the reinforcement in the second insertion hole. Therefore, even if the coating material on the surface of the panel thermally expands after thermal drying, the fixing member moves together with the panel. As a result, the coating material on the surface of the panel can be avoided from being scratched by the fixing member.

Further, in this configuration, even if the shaft of the fixing member moves together with the thermally expanded panel, the shaft does not make firm contact with the reinforcement. This can sufficiently maintain the fixing strength of the fixing member.

A second aspect of the present invention is an embodiment of the first aspect. In the second aspect, the fixing member includes a rivet which sandwiches the panel and the reinforcement.

In this configuration, the shaft of the rivet is inserted in the first and second insertion holes. Thus, the panel and the reinforcement are sandwiched between a pair of heads formed at both ends of the rivet.

A third aspect of the present invention is an embodiment of the second aspect. In the third aspect, the fixing member includes a washer which is disposed between one of heads of the rivet and the reinforcement, and through which a shaft of the rivet is inserted, and an outer diameter of the washer is larger than the diameter of the second insertion hole.

In this configuration, the washer is interposed between one of the heads of the rivet and the reinforcement. The diameter of the second insertion hole of the reinforcement is large enough to permit the displacement of the shaft. Thus, if one of the heads were directly brought into contact with the reinforcement, an area of contact between the head and the reinforcement would be insufficient, thereby lowering the fixing strength of the fixing member. In contrast, the presence of the washer ensures a sufficient area of contact between the fixing member and the reinforcement, which maintains the fixing strength to a sufficient degree.

A fourth aspect of the present invention is directed to a method for producing the panel structure of any one of the first to third aspects. The method includes: a fixing step of inserting a shaft of the fixing member in the first and second insertion holes, and sandwiching and fixing the panel and the reinforcement with the fixing member in their thickness direction, and a coating step of applying a coating material on a surface of the panel, and thermally drying the coating material, the coating step being performed after the fixing step.

In this method, the shaft of the fixing member is inserted in the first and second insertion holes so that the panel and the reinforcement are fixed together. Then, the surface of the panel is coated, and the surface is thermally dried. In this panel structure, the relative positions of the shaft of the fixing member and the panel do not change even if the panel thermally expands. Thus, the coating formed around the fixing member is not significantly pulled with the thermal expansion of the panel, which can avoid the coating from being scratched.

Advantages of the Invention

According to the present invention, the diameter of the second insertion hole of the reinforcement is made larger than the first insertion hole of the panel. This can avoid the coating on the surface of the panel from being scratched even if the panel structure is thermally dried. As a result, lowering of the surface appearance and anticorrosive property of the panel can be avoided.

BRIEF DESCRIPTION OF THE DRAWINGS

FIG. 6 illustrates a top view (upper view) and vertical cross-sectional view (lower view) of a major part of the panel structure of the embodiment in an enlarged scale, in which a rivet and a coating are not shown, the panel structure being in a state just after an installation step.

FIG. 7 illustrates a top view (upper view) and vertical cross-sectional view (lower view) of a major part of the panel structure of the embodiment in an enlarged scale, in which a coating is not shown, the panel structure being in a state just after a fixing step.

FIG. 8 illustrates a major part of the panel structure of the embodiment in an enlarged scale, the panel structure being in a state just after a coating step.

FIG. 9 is a view corresponding to FIG. 8, illustrating a state where an inner panel has thermally expanded in the coating step.

DETAILED DESCRIPTION

Embodiments of the present invention will be described in detail below with reference to the drawings. Note that the following description of embodiments is merely examples in nature, and is not intended to limit the scope, application, or uses of the present invention.

Figure 1:
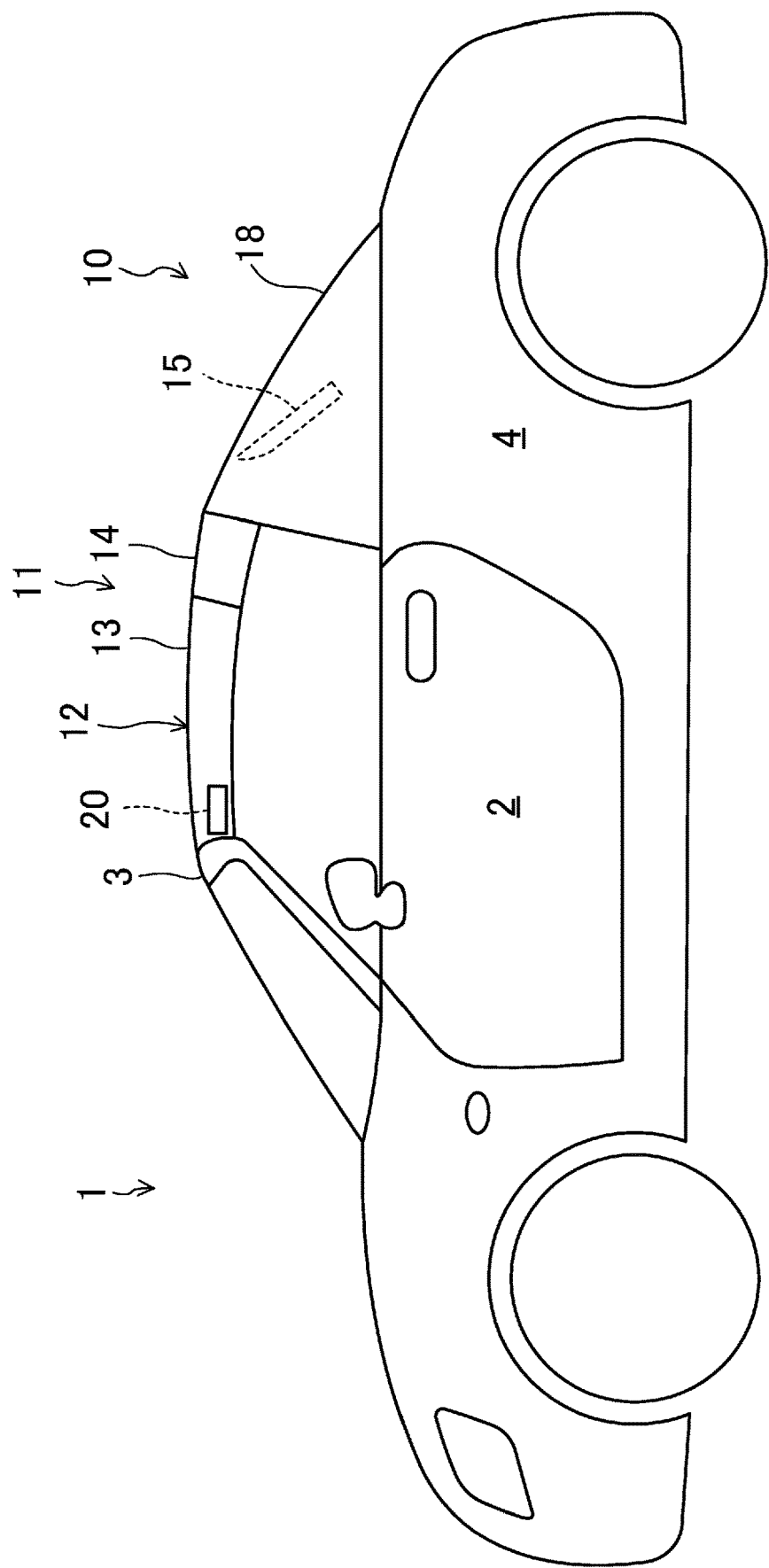
FIG. 1 is a schematic side view illustrating a general configuration of a vehicle according to an embodiment, with a cabin being closed.
Figure 2:
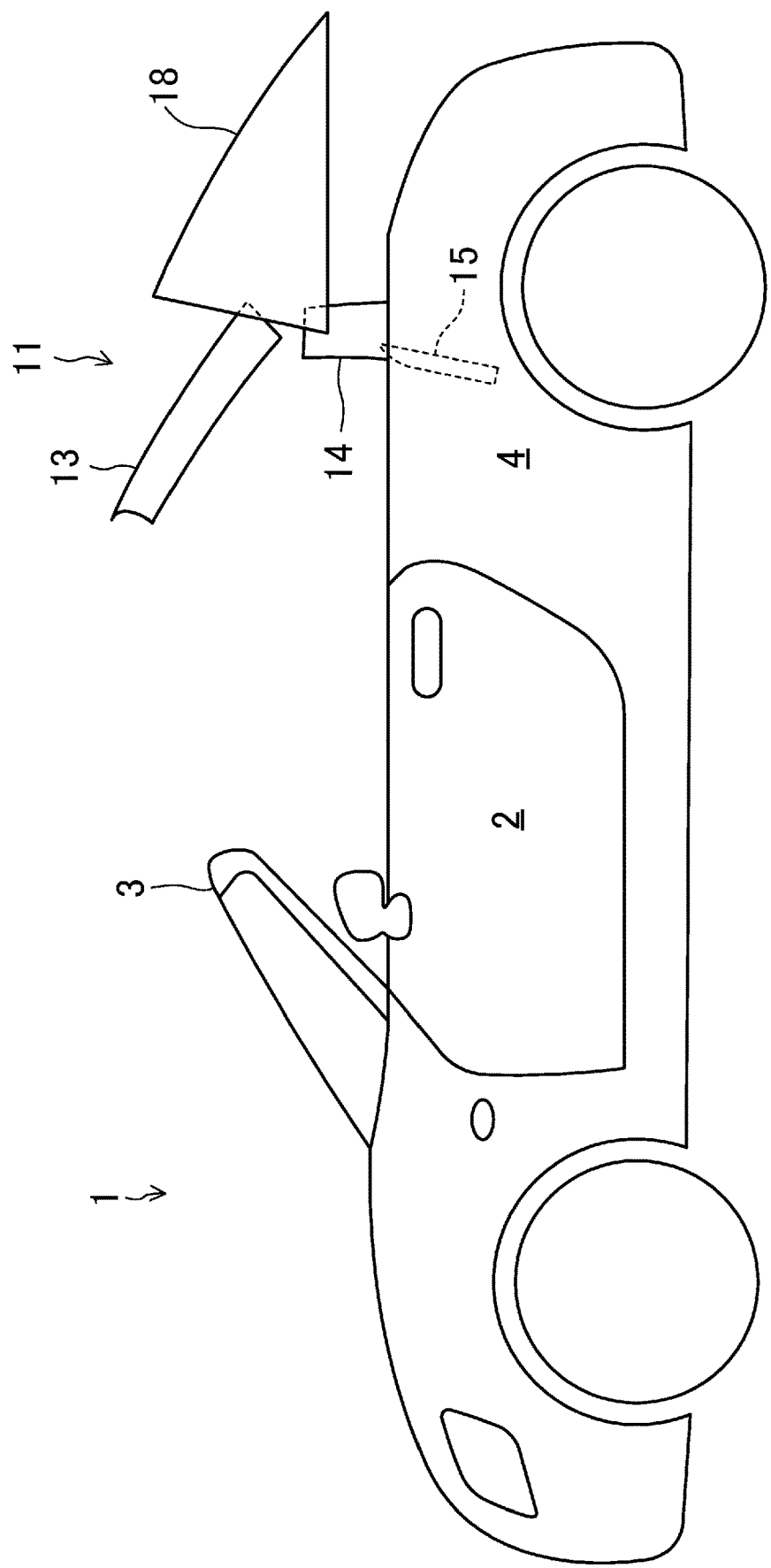
FIG. 2 is a schematic side view illustrating the general configuration of the vehicle according to the embodiment, with a retractable roof being located between a use position and a retracted position, and a deck cover being at a retreated position.
Figure 3:
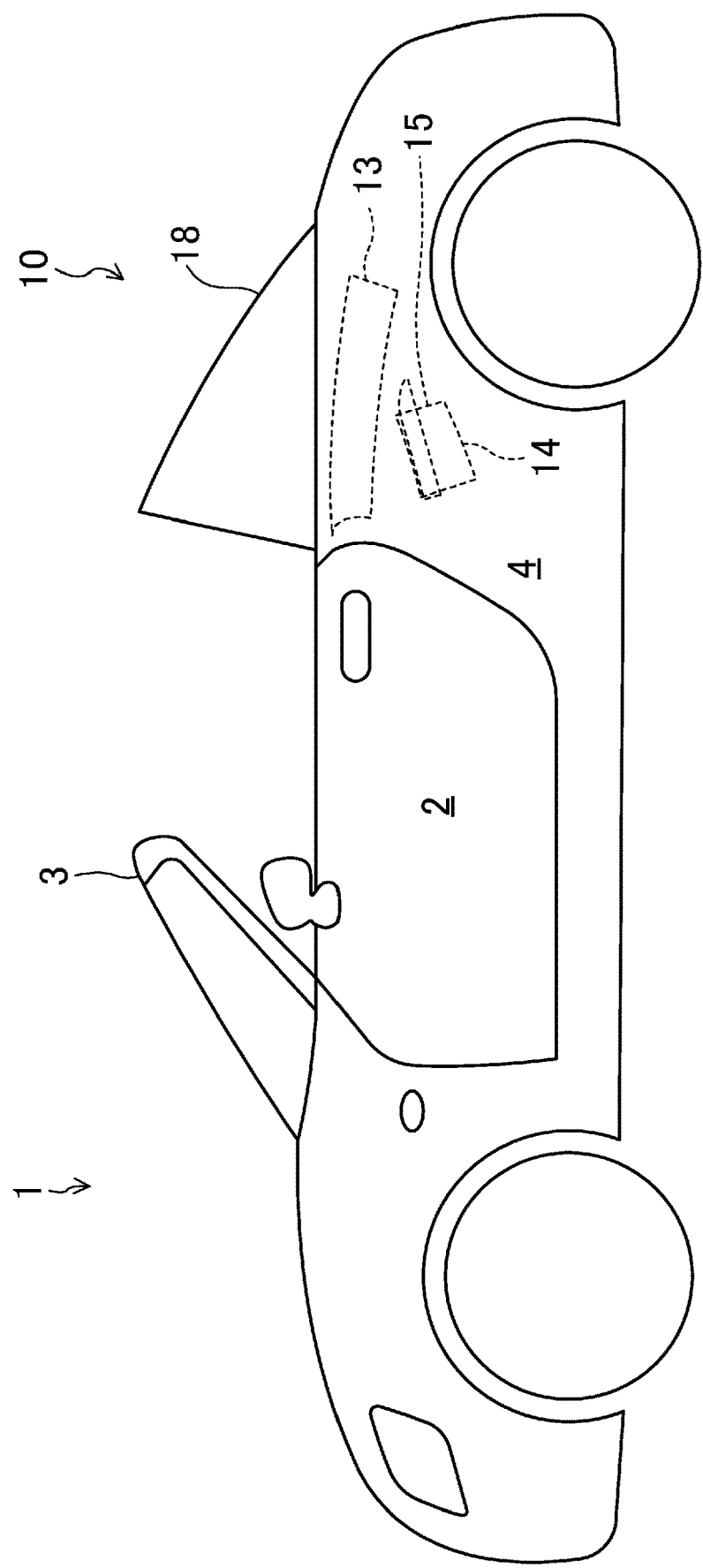
FIG. 3 is a schematic side view illustrating the general configuration of the vehicle according to the embodiment, with a cabin being open.

A vehicle 1 according to this embodiment shown in FIGS. 1 to 3 is equipped with an opening/closing device 10. The opening/closing device 10 is switchable between a closed state in which a roof member 12 covers a top of a cabin 2 and an open state in which the top of the cabin 2 is uncovered. The opening/closing mechanism 10 includes a retractable roof 11, a deck cover 18, and a lock mechanism 20. First, it will be described below the configurations of these components basically in a state where the cabin 2 is closed (the state shown in FIG. 1).

Retractable Roof

The retractable roof 11 includes a roof member 12, and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13 and a middle roof panel 14 disposed behind the front roof panel 13. The back window 15 is a transparent member, and disposed above a storage 4 formed in a rear portion of the vehicle 1.

The retractable roof 11 is driven by a roof drive mechanism (not shown). Specifically, the roof drive mechanism includes a first drive motor, and a first link mechanism which links the first drive motor and the retractable roof 11 together. The first link mechanism transfers rotational power of the first drive motor to the front roof panel 13, the middle roof panel 14, and the back window 15. Thus, the retractable roof 11 is movable between a use position (shown in FIG. 1) and a retracted position (shown in FIG. 3). The retractable roof 11 in the use position is located outside the storage 4 to cover the cabin 2. The retractable roof 11 in the retracted position is retracted into the storage 4, thereby uncovering the cabin 2.

Deck Cover

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame (not shown) to be fitted with the back window 15.

The deck cover 18 is driven by a deck drive mechanism (not shown). Specifically, the deck drive mechanism includes a second drive motor, and a second link mechanism which links the second drive motor and the deck cover 18 together. The second link mechanism transfers rotational power of the second drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame in the storage 4. The deck cover 18 in the retreated position is located further rearward and obliquely upward than in the home position, and uncovers the top opening of the storage 4. Thus, the deck cover 18 in the retreated position allows the retractable roof 11 to move between the use position and the retracted position.

Lock Mechanism

The lock mechanism 20 is attached to a front end of a lower surface (surface toward the inside of the cabin) of the front roof panel 13. The lock mechanism 20 includes a hook member (not shown) which is able to engage with a striker (not shown) fixed to a body (front header 3) of the vehicle 1. When the retractable roof 11 is in the use position, the hook member engages with the striker to lock the roof member 12 and the front header 3 together.

Operation of Opening/Closing Mechanism

It will be described below how the opening/closing mechanism 10 performs an opening operation and a closing operation with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the lock mechanism 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members (not shown) so that they move together toward the storage 4 (see, e.g., FIG. 2). When the front roof panel 13, the middle roof panel 14, and the back window 15 are all stored in the storage 4 in a folded state, the deck cover 18 in the retreated position returns to the home position (see FIG. 3). Thus, the cabin 2 is opened.

To close the open cabin 2, first, the deck cover 18 in the home position moves toward the retreated position. Then, the retractable roof 11 in the retracted position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIG. 1). Thus, the cabin 2 is closed. The lock mechanism 20 then locks the front header 3.

Detailed Configuration of Panel Structure

The front roof panel 13 is a panel structure 30 of the present invention. A detailed configuration of the panel structure 30 will be described in detail below with reference to FIGS. 4 to 8.

Figure 4:
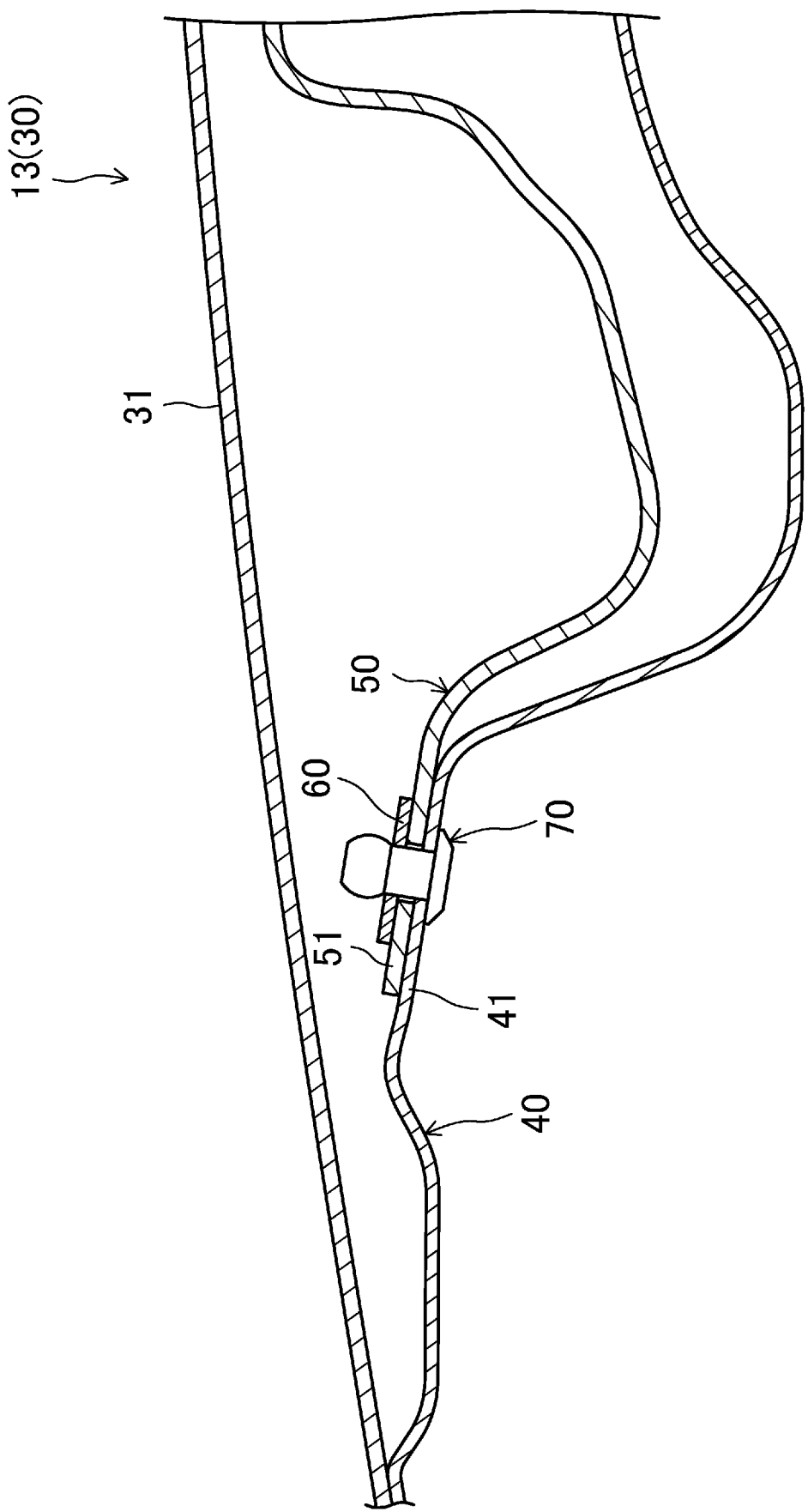
FIG. 4 is a vertical cross-sectional view of a panel structure according to the embodiment.

As shown in FIG. 4, the panel structure 30 includes an outer panel 31 toward the outside of the vehicle 1, an inner panel 40 toward the cabin 2, and a reinforcement 50 which reinforces the inner panel 40 from a rear surface (top surface) thereof. The inner panel 40 is made of aluminum, for example, and the reinforcement 50 is made of a material, e.g., a steel plate, having higher rigidity than the inner panel 40. The inner panel 40 has a higher thermal expansion coefficient than the reinforcement 50. The inner panel 40 has a larger dimension in a longitudinal direction of the vehicle than a dimension in a widthwise direction of the vehicle and a thickness in the vertical direction. Therefore, the inner panel 40 is easily deformed particularly in the longitudinal direction (the lateral direction in FIG. 4) when thermally expands.

The inner panel 40 has a panel's flat portion 41 at a middle portion thereof. The reinforcement 50 has a reinforcement's flat portion 51 at its end in the longitudinal direction. The panel's flat portion 41 and the reinforcement's flat portion 51 are stacked one after another in their thickness direction.

Figure 5:
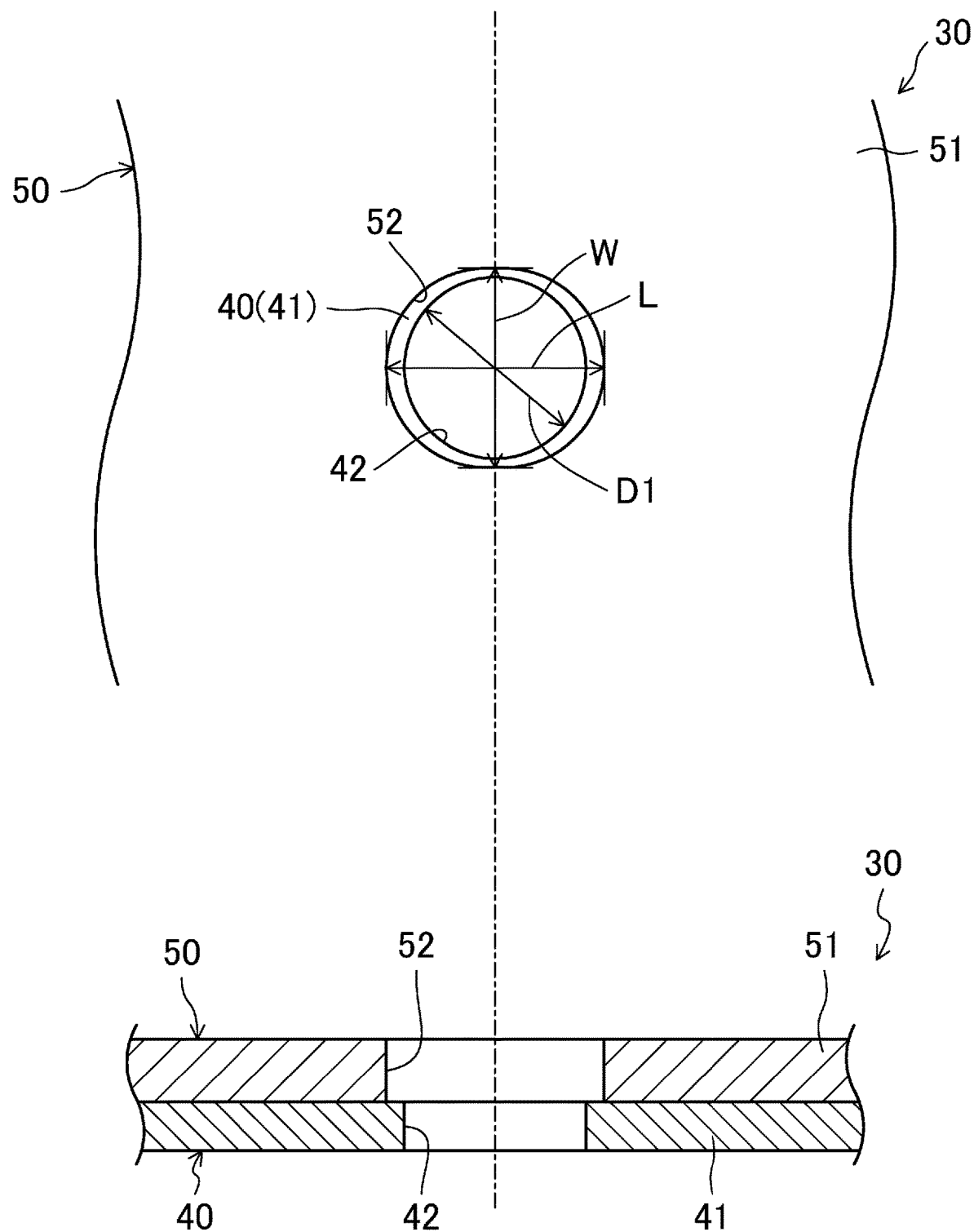
FIG. 5 illustrates a top view (upper view) and vertical cross-sectional view (lower view) of a major part of the panel structure according to the embodiment in an enlarged scale, in which a washer, a rivet, and a coating are not shown.

As shown in FIGS. 5 and 8, a panel's insertion hole 42 (first insertion hole) is formed through the panel's flat portion 41. The panel's insertion hole 42 is a round hole with a predetermined diameter D1 when viewed in plan. A reinforcement's insertion hole 52 (second insertion hole) is formed through the reinforcement's flat portion 51. The reinforcement's insertion hole 52 is an elongated hole. Specifically, the reinforcement's insertion hole 52 is, for example, an elongated, elliptic, or oval hole having a diameter in the longitudinal direction (long diameter L) larger than a diameter in the widthwise direction (short diameter W) when viewed in plan. The reinforcement's insertion hole 52 has the long and short diameters L and W larger than the diameter D1 of the panel's insertion hole 42.

As shown in FIGS. 6 to 8, the panel structure 30 has a washer 60 and a rivet 70. The washer 60 and the rivet 70 constitute a fixing member which sandwiches and fixes the inner panel 40 and the reinforcement 50 in their thickness direction.

The washer 60 is disposed across the reinforcement 50 from the inner panel 40. The washer 60 is in the shape of a round ring, or a doughnut when viewed in plan. Specifically, the washer 60 has a washer's insertion hole 61 which is a round hole when viewed in plan. The washer's insertion hole 61 has an inner diameter D2 which is approximately the same as the diameter D1 of the panel's insertion hole 42, for example. The washer 60 has an outer diameter D3 larger than the long and short diameters L and W of the reinforcement's insertion hole 52. The panel's insertion hole 42, the reinforcement's insertion hole 52, and the washer's insertion hole 61 have centers which are substantially aligned with each other in the thickness direction of the inner panel 40 of the panel structure 30.

The rivet 70 of this embodiment is, for example, a blind rivet. The rivet 70 has a columnar shaft 71, a first head 72 at a lower end of the shaft 71 in an axial direction thereof (an end toward the cabin 2), and a second head 73 at an upper end of the shaft 71 in the axial direction (an end toward the outside of the vehicle 1).

The shaft 71 is inserted in the panel's insertion hole 42, the reinforcement's insertion hole 52, and the washer's insertion hole 61. The shaft 71 has an outer diameter D4 which is slightly smaller than the diameter D1 of the panel's insertion hole 42 and the inner diameter D2 of the washer's insertion hole 61. That is, the shaft 71 fits in the panel's insertion hole 42 and the washer 60 with almost no clearance left therebetween. The outer diameter D4 of the shaft 71 is obviously smaller than the long and short diameters L and W of the reinforcement's insertion hole 52. That is, the shaft 71 loosely fits in the reinforcement's insertion hole 52 with a clearance 53 left between the shaft 71 and an inner peripheral edge of the reinforcement's insertion hole 52. The clearance between the reinforcement's insertion hole 52 and the shaft 71 is larger in the longer axis direction (longitudinal direction) than in the shorter axis direction (widthwise direction).

The rivet 70 has the first head 72 formed in advance before attachment. The second head 73 is formed when an end of a mandrel is crushed through the attachment of the rivet 70. The second head 73 has the maximum outer diameter D5 (see FIG. 7) which is larger than the inner diameter D2 of the washer 60 and smaller than the outer diameter D3 of the washer 60. In this panel structure 30, the first and second heads 72 and 73 of the rivet 70 sandwich the inner panel 40, the reinforcement 50, and the washer 60.

As shown in FIG. 8, a coating 80 is formed on a surface of the panel structure 30 facing the cabin 2. The coating 80 covers the whole surfaces of the inner panel 40 and the first head 72 of the rivet 70.

Method for Producing Panel Structure

A method for producing the panel structure 30 will be described in detail below with reference to FIGS. 5 to 8.

First, an installation step of stacking the inner panel 40, the reinforcement 50, and the washer 60 one after another is performed. In the installation step, the reinforcement's flat portion 51 is stacked on the panel's flat portion 41 (FIG. 5), and the washer 60 is then stacked on the reinforcement's flat portion 51(see FIG. 6).

After the installation step, a fixing step of sandwiching and fixing the inner panel 40 and the reinforcement 50 in the thickness direction with the rivet 70 is performed. In the fixing step, the shaft 71 of the rivet 70 already provided with the first head 72 is sequentially inserted in the panel's insertion hole 42, the reinforcement's insertion hole 52, and the washer's insertion hole 61 from the front surface of the inner panel 40. Then, a mandrel inside the rivet 70 is drawn toward the front surface of the inner panel 40 using a tool. Then, the tip end of the shaft 71 of the rivet 70 is crushed by the tip end of the mandrel, thereby forming the second head 73 (FIG. 7). In this fixing step, the step of fixing the rivet 70 is performed only from the front side of the inner panel 40.

Thus, in the panel structure 30 after the fixing step, the shaft 71 of the rivet 70 fits in the panel's insertion hole 42 and the washer's insertion hole 61 with almost no clearance, and the clearance 53 is formed between the shaft 71 and the inner peripheral edge of the reinforcement's insertion hole 52.

After the fixing step, a coating step of coating the surface of the inner panel 40 is performed. In the coating step, a coating material is applied to the whole surfaces of the inner panel 40 and the first head 72 of the rivet 70, and then thermally dried. As a result, a continuous coating 80 is formed over the whole surfaces of the inner panel 40 and the first head 72 of the rivet 70 (FIG. 8).

Thermal Expansion of Panel Structure

When the coating material is thermally dried in the coating step, the inner panel 40 and the reinforcement 50 thermally expand. The inner panel 40 has a relatively high thermal expansion coefficient, and is greatly deformed particularly in the longitudinal direction. Thus, if the relative positions of the first head 72 of the rivet 70 and the inner panel 40 change due to the thermal expansion of the inner panel 40, the coating formed around the first head 72 is scratched by the first head 72 in some cases.

According to this embodiment, the diameter of the reinforcement's insertion hole 52 (e.g., long diameter L and the short diameter W) is made larger than the diameter (inner diameter D1) of the panel's insertion hole 42. Thus, the clearance 53 which allows the movement of the shaft 71 is formed in the reinforcement's insertion hole 52. Specifically, the shaft 71 of the rivet 70 is restrained from moving relative to the inner panel 40 within the panel's insertion hole 42, while the shaft 71 is permitted to move relative to the reinforcement 50 within the reinforcement's insertion hole 52. Therefore, even if the inner panel 40 thermally expands in the coating step, the rivet 70 moves in a certain direction (e.g., in a direction indicated by white arrows in FIG. 9) together with the inner panel 40. Thus, the coating on the surface of the inner panel 40 can be avoided from being scratched by the rivet 70. This can avoid the surface appearance and anticorrosive property of the inner panel 40 from being impaired.

Further, in this configuration, even if the shaft 71 of the rivet 70 moves together with the inner panel 40 that has thermally expanded, the shaft 71 does not make firm contact with the reinforcement 50 as shown in FIG. 9. This can avoid concentration of stress on a region of contact between the shaft 71 and the reinforcement 50, thereby sufficiently maintaining the fixing strength of the rivet 70.

In this embodiment, the washer 60 is interposed between the second head 73 of the rivet 70 and the reinforcement 50. The reinforcement's insertion hole 52 has a relatively large diameter to ensure the clearance 53. Thus, if the washer 60 were not interposed, an area of contact between the second head 73 and the reinforcement 50 would decrease, resulting in low fixing strength. In contrast, the presence of the washer 60 ensures a sufficient area of contact between the washer 60 and the reinforcement 50. Thus, the fixing strength of the rivet 70 can be maintained to a sufficient degree.

Other Embodiments

The above-described embodiment may be modified as follows.

Figure 10:
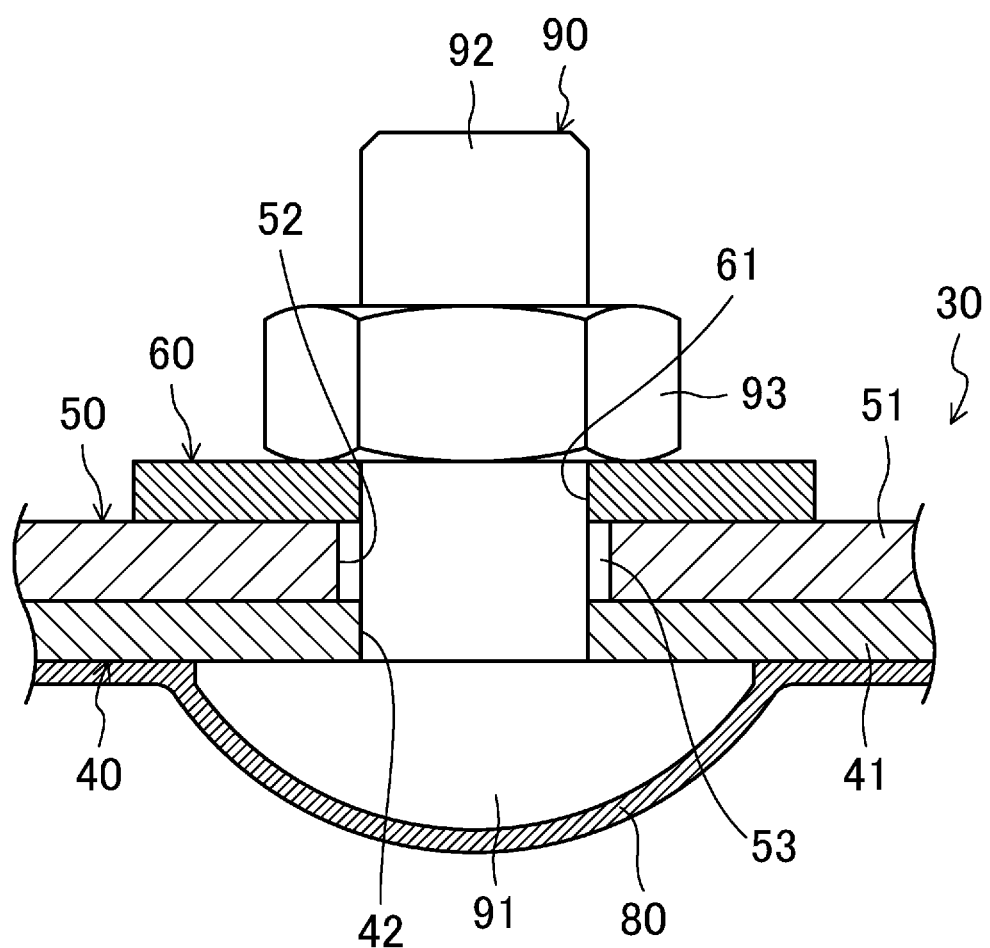
FIG. 10 is a view corresponding to FIG. 8, illustrating a panel structure according to a variation.

The rivet 70 of the fixing member may be replaced with a bolt 90 and a nut 93 as in a variation shown in FIG. 10. According to the variation, the bolt 90 includes a shaft 91 with a threaded portion, and a head 92 formed at an end of the shaft 91 (an end toward the cabin 2). The shaft 91 of the bolt 90 is inserted in the panel's insertion hole 42, the reinforcement's insertion hole 52, and the washer's insertion hole 61. The outer diameter of the shaft 91 of the bolt 90, and dimensions of the bolt 90 relative to other components are the same as those described in the above-described embodiment. The nut 93 is fastened to the threaded portion at the other end of the shaft 91.

Also in this variation, the bolt 90 and the nut 93 move together with the inner panel 40 when the inner panel 40 thermally expands. Thus, the coating 80 can be protected from being scratched by the head 92 of the bolt 90.

Alternatively, the washer 60 of the above-described embodiment and the variation may be omitted.

The reinforcement's insertion hole 52 may be a round hole when viewed in plan. In such a case, the reinforcement's insertion hole 52 may have a larger inner diameter than the panel's insertion hole 42.

The panel structure 30 may be applied to a component except for the front roof panel 13. For example, the panel structure 30 may be applied to the middle roof panel 14 or the deck cover 18.

In this panel structure 30, the number of the fixing members or each insertion hole is not limited to one, and two or more fixing members or two or more insertion holes may be provided.

INDUSTRIAL APPLICABILITY

As can be seen, the present invention is useful for a panel structure and a method for producing the same.

DESCRIPTION OF REFERENCE CHARACTERS

30 Panel Structure
40 Inner Panel (Panel)

42 Panel's Insertion Hole (First Insertion Hole)
50 Reinforcement
52 Reinforcement's Insertion Hole (Second Insertion Hole)
60 Washer
70 Rivet
71 Shaft
72 First Head
73 Second Head

The invention claimed is:

1. A panel structure, comprising:
a panel having a first insertion hole;
a reinforcement having a second insertion hole;
a fixing member having a shaft inserted in the first and second insertion holes, and sandwiching and fixing the panel and the reinforcement in their thickness direction; and
a coating formed to cover a surface of the panel and a surface of the fixing member, wherein:
    the panel has a higher thermal expansion coefficient than the reinforcement,
    a diameter of the second insertion hole at least in a direction of thermal expansion of the panel is larger than a diameter of the first insertion hole in the direction, and
    the fixing member moves together with the thermally expanded panel during thermal expansion of the panel such that damage to the coating is reduced during thermal expansion of the panel.

2. The panel structure of claim 1, wherein:
the fixing member includes a rivet which sandwiches the panel and the reinforcement.

3. The panel structure of claim 2, wherein:
the fixing member includes a washer which is disposed between one of heads of the rivet and the reinforcement, and through which a shaft of the rivet is inserted, and an outer diameter of the washer is larger than the diameter of the second insertion hole.

4. A method for producing the panel structure of claim 1 the method comprising:
a fixing step of inserting a shaft of the fixing member in the first and second insertion holes, and sandwiching and fixing the panel and the reinforcement with the fixing member in their thickness direction, and
a coating step of applying the coating material on a surface of the panel, and thermally drying the coating material, the coating step being performed after the fixing step.

5. A method for producing the panel structure of claim 2, the method comprising:
a fixing step of inserting a shaft of the fixing member in the first and second insertion holes, and sandwiching and fixing the panel and the reinforcement with the fixing member in their thickness direction, and
a coating step of applying the coating material on a surface of the panel, and thermally drying the coating material, the coating step being performed after the fixing step.

6. A method for producing the panel structure of claim 3, the method comprising:
a fixing step of inserting a shaft of the fixing member in the first and second insertion holes, and sandwiching and fixing the panel and the reinforcement with the fixing member in their thickness direction, and
a coating step of applying the coating material on a surface of the panel, and thermally drying the coating material, the coating step being performed after the fixing step.

* * * * *